United States Patent Office 3,595,973
Patented July 27, 1971

3,595,973
N-PARA SECONDARY HYDROCARBON AMINO PHENYLMORPHOLINES
Richard W. Kibler, Cuyahoga Falls, Ohio, assignor to The Firestone Tire & Rubber Company, Akron, Ohio
No Drawing. Original application July 21, 1965, Ser. No. 473,821. Divided and this application Mar. 17, 1969, Ser. No. 829,826
Int. Cl. C07d 87/40
U.S. Cl. 260—247
8 Claims

ABSTRACT OF THE DISCLOSURE

N(p-sec. aminophenyl) morpholine and piperazine and 2,6-dimethyl morpholine compounds are disclosed which are rubber antiozonants.

---

This application is a division of Kibler Ser. No. 473,821 filed July 21, 1965.

This invention relates to new antiozonants and anti-oxidants (referred to herein as antiozonants) for use in natural and synthetic rubber vulcanizates, their preparation, rubbers containing them, and the method of curing rubbers in the presence of the new compounds.

The new compounds have the following formula

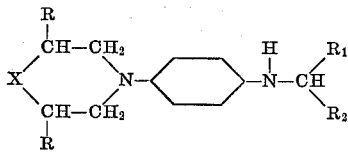

in which (a) When X is O, R is hydrogen or an alkyl group of 1 to 5 carbon atoms, and $R_1$ and $R_2$ are a straight or branched chain or hydroxy alkyl group of 1 to 10 carbon atoms or an aryl group of the class consisting of phenyl and naphthyl and lower alkyl and alkoxy derivatives of said aryl group in which the alkyl group is a lower branched or straight chain alkyl group of 1 to 4 carbon atoms); and $R_1CHR_2$ may be a cycloalkyl group of 5 to 8 carbon atoms; and (b) When X is NH or

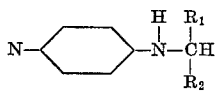

R is hydrogen, and $R_1$ and $R_2$ is each hydrogen or one may be hydrogen and the other a straight or branched chain alkyl group of 1 to 10 carbon atoms or an aryl group (e.g. phenyl, naphthyl, alkylphenyl, alkoxyphenyl, etc., in which the alkyl group is a lower straight or branched chain group of 1 to 4 carbon atoms), and $R_1CHR_2$ may be a cycloalkyl group of 5 to 8 carbon atoms;

Representative compounds are:

N-(p-isopropylaminophenyl) morpholine
N-(p-sec-butylaminophenyl) morpholine
N-(p-sec-hexylaminophenyl) morpholine
N-(p-2-octylaminophenyl) morpholine
N-(p-cyclohexylaminophenyl) morpholine
N-(p-isopropylaminophenyl)-2,6-dimethyl morpholine
N-(p-cyclohexylaminophenyl)-2,6-dimethyl morpholine
N-[p-2-(3-phenylpropyl)aminophenyl] morpholine
N-[p-2-(1,3-diphenylpropyl)aminophenyl] morpholine
N-[p-2-(3-p-tolylpropyl)aminophenyl] morpholine
N-[p-2-(3-p-ethoxyphenylpropyl)aminophenyl] morpholine
N-(p-isopropylaminophenyl) piperazine
N-(p-cyclohexylaminophenyl) piperazine
N,N'-bis(p-isopropylaminophenyl) piperazine
N-[p-2-(4-hydroxy-4-methylpentyl)aminophenyl] morpholine
N-[p-2-(4-hydroxy-4-methylpentyl)aminophenyl]-2,6-dimethyl morpholine
N-[p-2-(5-hydroxyhexyl)aminophenyl]-2,6-dimethyl morpholine In each of the compounds of the foregoing list in which the amine group is substituted by a secondary alkyl group, the substituent on the alpha carbon is methyl.

The rubbers which may be improved by the antiozonants are diene rubbers, i.e. natural and synthetic homopolymers and synthetic copolymers of hydrocarbon dienes containing 4 and 5 carbon atoms (viz. butadiene, isoprene and piperylene), the copolymers being copolymers of such dienes with monomers such as styrene, alkyl-substituted styrenes, vinyl toluene, acrylonitrile, lower-alkyl acrylate and methacrylate esters, etc.

The antiozonants are readily prepared from N(4-nitrophenyl) morpholine, or an identically substituted 2,6-disubstituted morpholine (the substituents being alkyl groups of 1 to 8 carbon atoms), or N(4-nitrophenyl) piperazine or N,N'-bis-(4-nitrophenyl) piperazine. The nitro compound is reacted with a ketone and hydrogen which on reduction reaction with the nitro group (usually with a catalyst) gives the desired aminophenyl grouping. The ketone has the formula $O:CR_1R_2$ in which $R_1$ and $R_2$ have the values given in the foregoing formula for the antiozonant. These ketones include:

acetone
cyclohexanone
2-octanone
2-butanone
4-methyl-2-butanone
propiophenone
benzophenone
dibenzylketone
phenylacetone
acetophenone
cyclohexyl phenyl ketone
and ketones in which there are homologous alkyl groups of 1 to 10 carbon atoms.

The following examples illustrate the preparation of such compounds, and the preparation of N(4-nitrophenyl) morpholine and N(4-nitrophenyl) 2,6-dimethyl morpholine is included.

PREPARATION OF N-(4-NITROPHENYL) MORPHOLINE

In a 1-liter round-bottom flask fitted with a reflux condenser, a thermometer and a mechanical stirrer was placed 158 gr. (1 mole) of 1-chloro-4-nitrobenzene and 264 ml. (ca. 3 moles) of morpholine. The reactants were heated at reflux with stirring for about 4 hours and then allowed to cool. The reaction mixture was slurried with water and filtered. The yellow crystalline solid was washed with water and air dried. The product melted at 150–151° C.

EXAMPLE 1

Preparation of N-(p-isopropylaminophenyl) morpholine

The N-(4-nitrophenyl) morpholine (10.4 gr., 0.05 mole), acetone (6.4 gr., 0.11 mole), glacial acetic acid (1 ml.), platinum oxide (0.1 gr.), and 100 ml. of ethanol were mixed and hydrogenated on a Paar hydrogenator apparatus at an initial hydrogen pressure of 50 p.s.i.g. When the uptake of hydrogen had ceased, the reaction mixture was removed and filtered. The solution was evaporated to dryness and the product recrystallized from ether. The product was diamond-shaped colorless crystals, M.P. 101–102° C.

*Analysis.*—Calc'd for $C_{13}H_{20}N_2O$ (percent): C, 70.88; H, 9.15; N, 12.72. Found (percent): C, 71.00; H, 9.25; N, 12.63.

EXAMPLE 2

Preparation of N-(p-2-octylaminophenyl) morpholine

The title compound was prepared in the same manner as in Example 1 except that 2-octanone was used in place of the acetone. The product was a colorless solid melting at 60–61° C.

*Analysis.*—Calc'd for $C_{18}H_{30}N_2O$ (percent): C, 74.74; H, 10.20; N, 9.40. Found (percent), C, 74.45; H, 10.42; N, 9.65.

EXAMPLE 3

Preparation of N-(p-cyclohexylaminophenyl) morpholine

This compound was prepared in the same manner as shown in Example 1 except that cyclohexanone was used in place of acetone. The product was worked up and purified in the usual manner and melted at 126–127° C.

*Analysis.*—Calc'd for $C_{16}H_{24}N_2O$ (percent): C, 73.80; H, 9.29; N, 10.76. Found (percent): C, 73.65; H, 9.39; N, 11.07.

EXAMPLE 4

Preparation of N-(p-sec-butylaminophenyl) morpholine

This compound was prepared in the same manner as shown in Example 1 except that 2-butanone was used in place of the acetone. The colorless crystalline product melted at 85–87° C.

*Analysis.*—Calc'd for $C_{14}H_{22}N_2O$ (percent): C, 71.76; H, 9.46; N, 11.98. Found (percent): C, 71.70; H, 9.36; N, 11.98.

EXAMPLE 5

Preparation of N-[p-2-(4-methylpentyl)aminophenyl] morpholine

This compound was prepared in the same manner as shown in Example 1 except that 4-methyl-2-pentanone was used in place of the acetone. The product was isolated in the usual manner and melted at 64–66° C.

*Analysis.*—Calc'd for $C_{16}H_{26}N_2O$ (percent): C, 73.23; H, 9.99; N, 10.68. Found (percent): C, 73.05; H, 10.10; N, 10.68.

Preparation of N-(p-nitrophenyl)-2,6-dimethyl morpholine

In a 1-liter round-bottom flask fitted with a reflux condenser, a mechanical stirrer and a thermometer was placed 158 gr. (1.0 mole) of 1-chloro-4-nitrobenzene and 351.0 gr. (3.0 moles) of 2,6-dimethyl morpholine. The reaction mixture was heated at reflux with stirring for four hours, cooled and filtered. The orange crystalline product was air dried.

EXAMPLE 6

Preparation of N-(p-isopropylaminophenyl)-2,6-dimethyl morpholine

The N-(p-nitrophenyl)-2,6-dimethyl morpholine (11.8 gr., 0.05 mole), acetone (3.2 gr., 0.055 mole), glacial acetic acid (1 ml.), platinum oxide (0.2 gr.), and absolute ethanol (100 ml.) were mixed and hydrogenated on a Paar hydrogenator apparatus at an initial hydrogen pressure of 50 p.s.i.g. When the uptake of hydrogen had ceased, the reaction mixture was filtered to remove the catalyst and evaporated leaving an oily residue which was purified by chromatography on alumina. The product was a red viscous oil.

*Analysis.*—Calc'd for $C_{15}H_{24}N_2O$ (percent): C, 72.53; H, 9.74; N, 11.28. Found (percent): C, 71.40; H, 9.71; N, 10.97.

EXAMPLE 7

Preparation of N-(p-cyclohexylaminophenyl)-2,6-dimethyl morpholine

This compound was prepared in the same manner as in Example 6 except cyclohexanone was used in place of the acetone. The oil product was purified by chromatography on alumina.

*Analysis.*—Calc'd for $C_{18}H_{28}N_2O$ (percent): C, 74.95; H, 9.78; N, 9.73. Found (percent): C, 74.92; H, 9.83; N, 9.61.

EXAMPLE 8

Preparation of N-(p-cyclohexylaminophenyl) piperazine

A mixture of N-(p-nitrophenyl) piperazine (10.3 gr., 0.05 mole), cyclohexanone (5.4 gr., 0.055 mole) glacial acetic acid (1 ml.), platinum oxide (0.1 gr.) and absolute ethanol (100 ml.) was hydrogenated at an initial hydrogen pressure of 50 p.s.i.g. After the uptake of hydrogen had ceased, the reaction mixture was filtered and evaporated. The residue was dissolved in ether (only partially soluble) and filtered. The ether soluble material was chromatographed on alumina. The ether eluates upon recrystallization from ether melted at 101–102° C.

*Analysis.*—Calc'd for $C_{16}H_{25}N_3$ (percent): N, 16.20. Found (percent): N, 15.90.

The antiozonants are added to the rubber in any usual antiozonant amount together with sulfur and other compounding ingredients and cured at a usual temperature.

MORPHOLINE ANTIOZONANT CURES

The following table gives the physical properties of test samples containing 2 parts of different antiozonants in butadiene-styrene copolymer (GR–S) in a usual sulfur-containing formula, the rubbers having been cured for 60 minutes and 280° F., and then subjected to aging 2 days in an oven at 212° F., and antiozonant evaluation in a dynamic test on samples exposed to an atmosphere containing 60 parts per million of ozone for 7 hours at 95° F. The ozone cracking was graded on this scale: very, very slight (v. v. sl.) and slight (sl.), with a plus or minus to indicate greater or less cracking, respectively, than indicated by the abbreviation. The test materials are identified as A=N(p-isopropylaminophenyl) morpholine
B=N(p-sec-butylaminophenyl) morpholine
C=N(p-2-octylaminophenyl) morpholine
D=N(p-cyclohexylaminophenyl) morpholine
E=N(p-isopropylaminophenyl)-2,6-dimethyl morpholine
F=N(p-cyclohexylaminophenyl)-2,6-dimethyl morpholine

| Test material | A | B | C | D | E | F |
|---|---|---|---|---|---|---|
| Physical properties: | | | | | | |
| *Before aging:* | | | | | | |
| 300% modulus, p.s.i. | 1,475 | 1,475 | 1,500 | 1,325 | 1,600 | 1,500 |
| 400% modulus, p.s.i. | 2,200 | 2,200 | 2,400 | 2,100 | 2,275 | 2,300 |
| Tensile strength, p.s.i. | 3,350 | 3,200 | 3,700 | 3,400 | 3,300 | 3,375 |
| Elongation, percent | 580 | 520 | 580 | 550 | 560 | 560 |
| *After aging:* | | | | | | |
| 300% modulus, p.s.i. | 2,800 | 2,525 | 2,700 | 2,300 | 2,900 | 2,400 |
| Tensile strength, p.s.i. | 2,800 | 2,525 | 3,225 | 2,775 | 2,900 | 2,825 |
| Elongation, percent | 300 | 300 | 320 | 350 | 300 | 330 |
| Ozone cracking | v.v.sl.+ | sl.+ | sl.+ | v.v.sl.+ | v.v.sl.+ | v.v.sl.+ |

Toxicity tests on all of these compounds showed them to be devoid of any adverse toxic effect.

What I claim is:

1. A compound of claim 8 which is N-(p-2-octyl-aminophenyl) morpholine.

2. A compound of claim 8 which is N-(p-isopropylaminophenyl)-2,6-dimethyl morpholine.

3. A compound of the formula

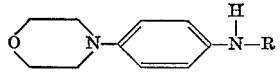

and wherein R is cycloalkyl of 5 to 8 carbon atoms or secondary alkyl of 3 to 10 carbon atoms in which a substituent on the alpha carbon is methyl.

4. 4-[p-(isopropylamino)phenyl]morpholine of the formula

5. 4-[p-(1-methylpropylamino)phenyl]morpholine of the formula

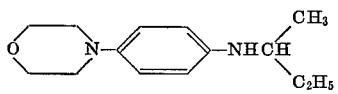

6. 4-[p-(1,3-dimethylbutylamino)phenyl]morpholine of the formula

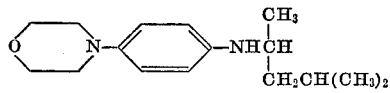

7. 4-[p-(cyclohexylamino)phenyl]morpholine of the formula

8. A compound having the formula

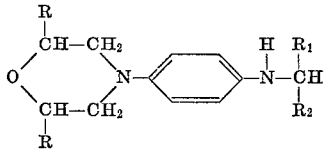

in which R is hydrogen or an alkyl group of 1 to 5 carbon atoms, and $R_1$ and $R_2$ are each alkyl groups of 1 to 10 carbon atoms or $R_1CHR_2$ is cyclohexyl.

References Cited

UNITED STATES PATENTS

| | | | |
|---|---|---|---|
| 1,937,844 | 12/1933 | Reed | 95—88 |
| 3,392,170 | 7/1966 | D'Amico et al. | 260—247.5 |

ALEX MAZEL, Primary Examiner

J. TOVAR, Assistant Examiner

U.S. Cl. X.R.

260—45.8, 800